United States Patent [19]

Picard et al.

[11] 4,353,268
[45] Oct. 12, 1982

[54] CONNECTING RODS

[75] Inventors: Claude Picard, Asnieres; Daniel Daugny, Tournon, both of France

[73] Assignees: Avions Marcel Dassault-Breguet Aviation, Vaucresson; Societe Anonyme de Recherches de Mecanique Appliquee-Sarma, St. Vallier sur Rhone, both of France

[21] Appl. No.: 775,050

[22] Filed: Mar. 7, 1977

[51] Int. Cl.³ .......................... G05G 1/00; G05G 3/00
[52] U.S. Cl. .......................................... 74/587; 74/589
[58] Field of Search .................. 74/586, 579; 403/267

[56] References Cited

U.S. PATENT DOCUMENTS

| 992,576 | 5/1911 | Mead | 74/579 |
|---|---|---|---|
| 3,037,529 | 6/1962 | Hancik | 138/140 X |
| 3,218,753 | 11/1965 | Wylie | 403/267 |
| 3,295,558 | 1/1967 | Levenetz | 138/140 |
| 3,362,253 | 1/1968 | Ditlinger | 74/579 R |
| 3,407,101 | 10/1968 | Lockshaw | 138/140 X |
| 3,422,592 | 1/1969 | Gjerde | 403/267 |
| 3,646,610 | 2/1972 | Jackson | 138/140 X |
| 3,721,134 | 3/1973 | Lamke | 74/586 |
| 3,844,315 | 10/1974 | Williams | 138/140 |
| 3,913,625 | 10/1975 | Gazda et al. | 138/140 |
| 4,014,370 | 3/1977 | McNulty | 138/141 X |
| 4,020,929 | 5/1977 | Goldin | 74/586 X |

*Primary Examiner*—Samuel Scott
*Assistant Examiner*—Wesley S. Ratliff, Jr.
*Attorney, Agent, or Firm*—William J. Daniel

[57] ABSTRACT

A connecting rod for the control and/or transmission of force, particularly for use in aeronautical construction, comprises a tubular body formed of high-strength fibres bonded together by polymerized epoxy resin. The body has frusto-conical end portions each surrounding a frusto-conical skirt portion of an end member which is adapted to receive coupling means. A ferrule, also formed of bonded fibres, is provided to tighten each frusto-conical end portion of the body against the frusto-conical skirt portion of the corresponding end member.

6 Claims, 6 Drawing Figures

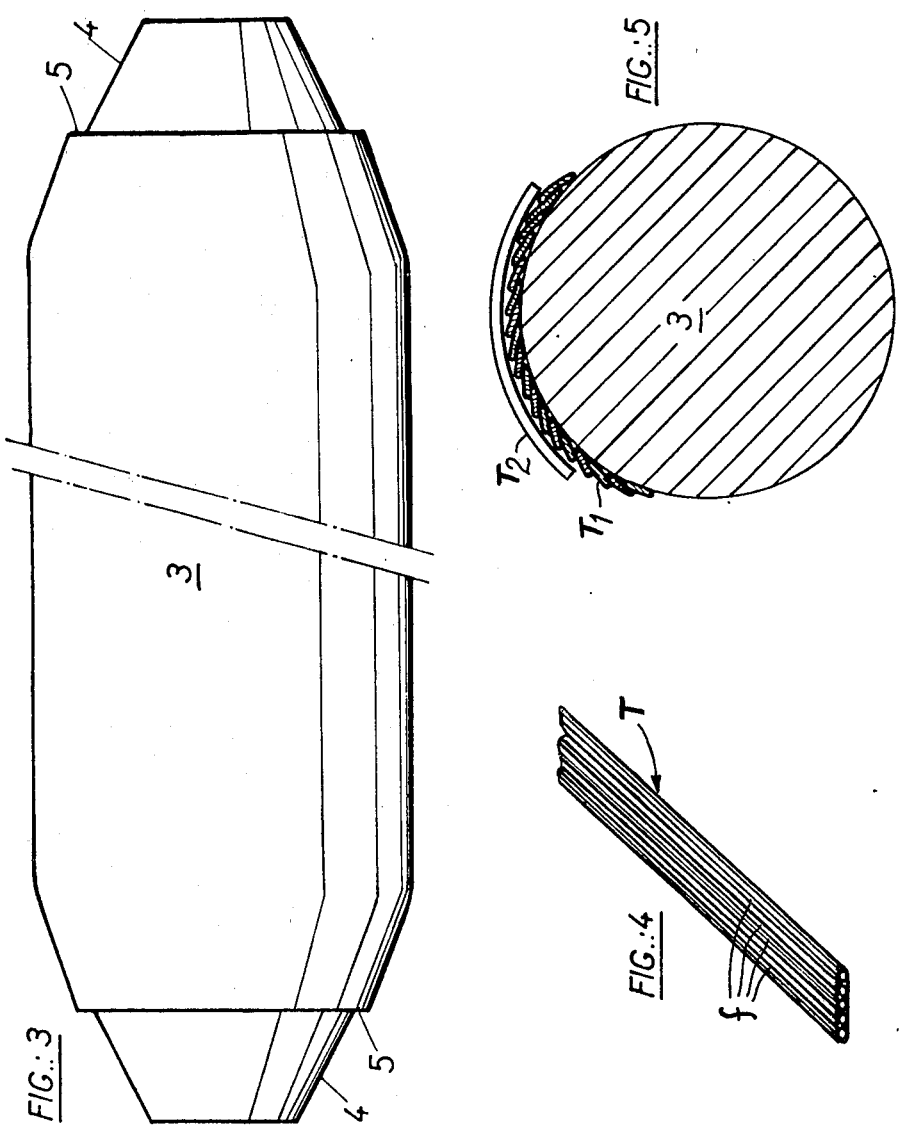

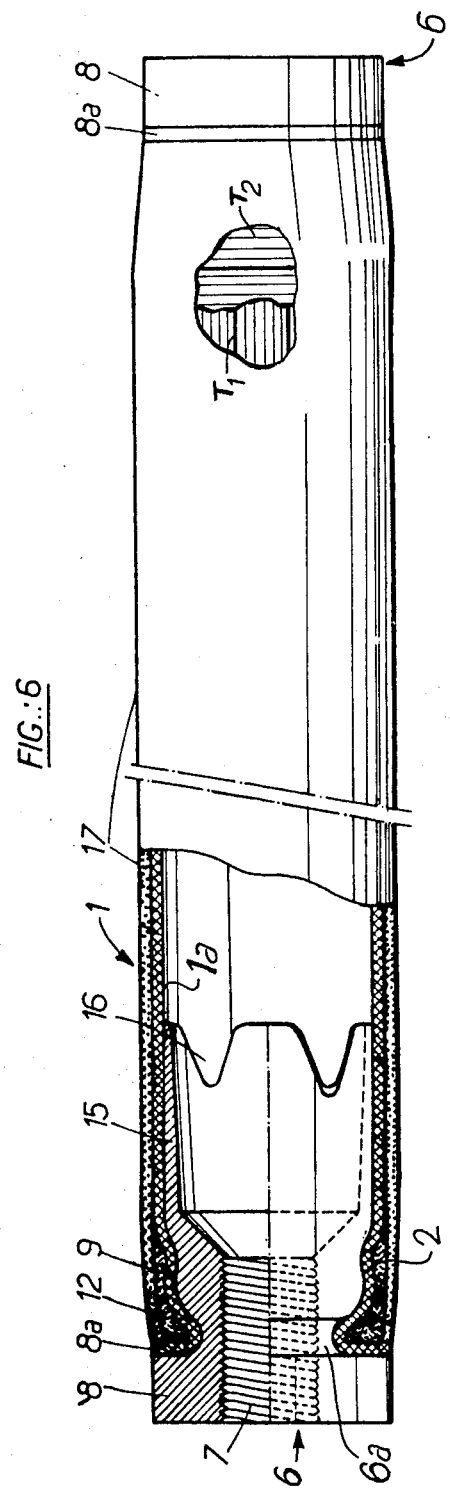

CONNECTING RODS

This invention relates to connecting rods for the control and/or transmission of force or power, for use especially, but not exclusively, in aeronautical construction.

As is known, the moving elements of a modern aircraft, whether they be for directional or for altitude control, or the moving parts of a variable configuration jet nozzle, are generally controlled by hydraulic rams, the pistons of which are connected by rods to the controlled elements.

Such rods generally consist of a metal tube of sufficient diameter to withstand the forces which may be applied, with a relatively thin wall, the tube ending in conical parts which serve for the attachment of coupling members to the rod and which have a progressively increasing wall thickness towards the smaller diameter end, to provide adequate strength.

On the other hand, the appearance on the market of special fibres having high specific strength, such as carbon fibres, boron fibres, fibres of certain polyamides, glass fibres etc., has led designers to study light structures using such fibres. These fibres may be employed in the form of tape consisting of parallel fibres encased in non-polymerised or partly polymerised synthetic resin, especially epoxy resin.

The applicants have undertaken the task of producing a connecting rod using such fibres. A particularly difficult aspect of such a rod is the attachment to its ends of coupling members which have to be connected to the fibre body in such a way as to ensure adequate power or force transmission under tension as well as under compression.

According to the invention there is provided a connecting rod for the control and/or transmission of force or powder, which has a tubular body formed of high-strength fibres bonded together by a polymerised synthetic resin, the body having frusto-conical end portions each surrounding a frusto-conical portion of an end member intended to receive coupling means.

Preferably each of the end members includes a cylindrical or conical skirt extending towards the centre of the connecting rod and engaging the cylindrical walls of the connecting rod body, the skirt exhibiting a degree of radial flexibility. Such flexibity may be provided by axial indentations or notches distributed along the free edge of the skirt. Alternatively, or in addition, the thickness of the skirt can be reduced towards this edge .

This flexibility of the skirt allows it to yield radially under the action of deformation of the body of the connecting rod so as to avoid excessive stress concentrations. The flexibility also permits an exterior ferruling of the body of the connecting rod without permanent displacement of the fibrous composition in the area of the metal members. Resistance to the impact of projectiles is also thus improved when the effect of these is limited to a simple perforation.

Connecting rods in accordance with the invention will now be described, by way of example, with reference to the accompanying drawings, in which:

FIG. 3 shows, in elevation, a mandrel or core used for making the rod,

Figure 1:
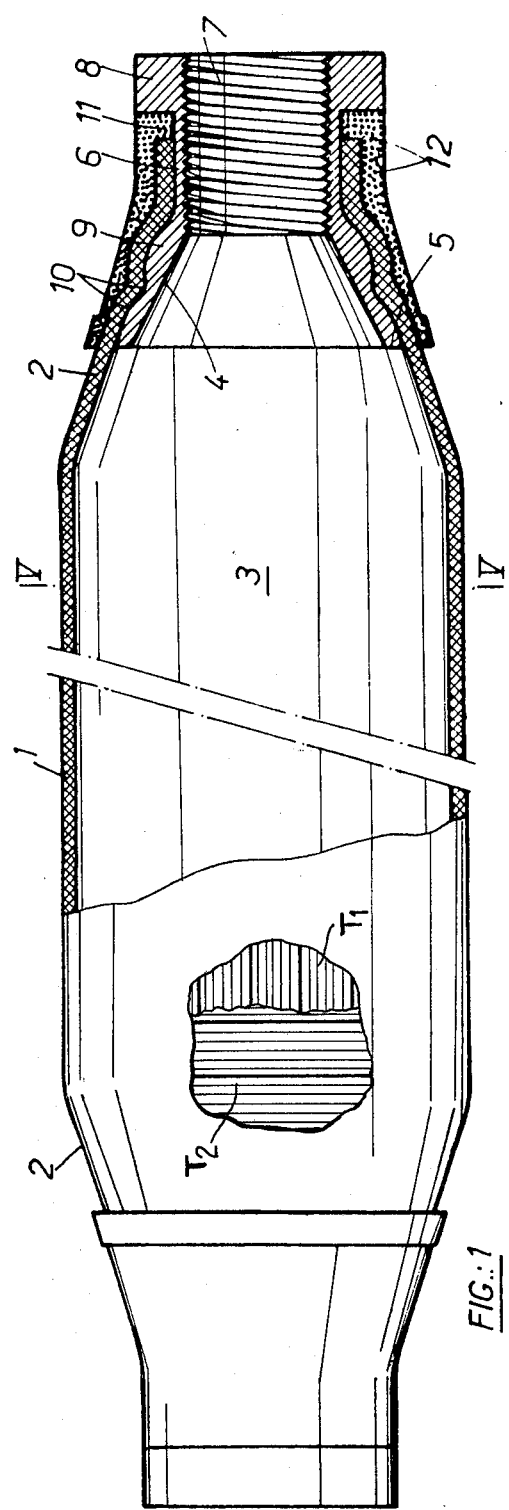
FIG. 1 shows a connecting rod, partly in elevation and partly in axial section.

FIG. 4 shows, on a larger scale, a piece of encased fibre tape which can be used in carrying out the invention, FIG. 5 is a section along the line V—V of FIG. 1 at a stage in manufacture, and FIG. 6 shows an alternative form of connecting rod, in which one of the metal end members is shown partly in axial section and partly in elevation, the body being cut away as necessary to show the preferred orientation of the tapes thereof.

The general shape of the connecting rod can be seen clearly in FIG. 1. It comprises a hollow tubular body 1 having a generally cylindrical main portion 1a terminating at each end in a frusto-conical portion 2 to the free end of which is to be fitted a coupling member (not shown) intended to constitute the joint between the rod and equipment controlled thereby.

An example of a method of manufacture of a rod according to the invention is as follows.

A mandrel 3 (shown in FIG. 3) is taken having the same general shape as the rod but made in such a manner that after forming the rod on the mandrel 3, it will be possible to remove the mandrel 3, in spite of the frusto-conical shape of the rod ends. Various methods of making mandrels of this kind are well known to the specialist.

For example, a multi-section mandrel can be employed, having a central section and a plurality of subsidiary sections all sufficiently small to be withdrawn through the ends of the rod, with dividing surfaces which are parallel to the axis of the rod, in such a manner that after removing the central section, the other sections may also be removed. The mandrel may alternatively be composed of easily breakable packed sand, or again, of a material soluble in a neutral liquid, or of a material having a low melting point.

Figure 2:
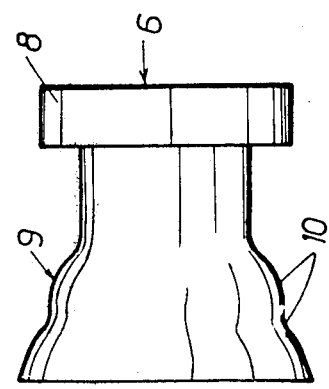
FIG. 2 shows, in elevation, a metallic end member used in the rod.

The mandrel 3 includes, at each of its ends, a frusto-conical extension 4 having a step 5. A tubular metal end member 6, shown in section in FIG. 1 and in elevation in FIG. 2, is slid on to the extension 4 at each end of the mandrel 3.

This end member 6 has a cylindrical portion 7 with threads to receive the coupling member, a projecting collar 8 and a frusto-conical skirt portion 9 which exactly fits the extension 4 of the mandrel. The thickness at the end of the frusto-conical portion 9 is equal to the height of the step 5, in such a way that the outer surface of the portion is flush with that of the mandrel 3. The outer surface of the skirt portion 9 is provided with circumferentially extending convolutions or grooves 10.

Once the end members 6 have been fitted to the mandrel 3, tapes T of carbon fibre or other selected fibres f encased in non-polymerised or partly polymerised epoxy resin are applied (shown in detail in FIG. 4), these tapes being of a tar-like plastic nature. In these tapes, the fibres 4 may be arranged parallel or otherwise, for example braided. As shown in plan in a broken away region of FIG. 6 and in section in FIG. 5, an initial layer T1 of such tapes can be placed on the mandrel parallel to its generatrix in such a manner that the tapes overlap a little at their edges (see FIG. 5), the width of overlap naturally increasing at each frusto-conical end 4 of the mandrel 3 between the major base and the minor base of the frustum. The length of the tapes T is such that there exists a certain gap 11 between their ends and the collars 8 of the metal end members 6.

After this initial layer has been applied, a second layer T2 is superposed, this time of tape wound helically from end to end of the first layer, then a third layer parallel to the generatrix as in the initial layer, then a fourth helical layer but in a reverse direction to the second layer and so on.

This succession of layers may be widely modified. For example, the directions of the successive layers may be varied, or again several layers of the same direction may be superposed, and possibly layers of fibres of different kinds may be used.

It is to be noted that the variation in width of the overlaps at the frusto-conical ends 4 of the mandrel 3 has the effect of causing a progressive increase in wall thickness at each end between the major base and the minor base of the frustum, which is favourable for the mechanical strength of the connecting rod.

Following this layer formation, the assembly of layers is tightened at each end on to the metallic end member 6 strongly enough for the layers to conform to the convolutions or grooves 10. This tightening is done by winding on fibres 12 similar to those already indicated, or possibly using metallic rings, the whole constituting a ferrule. The assembly is then put into an oven to polymerise the resin which hardens around the fibres it encases, after which the mandrel 3 is removed.

In this way, a light, high strength connecting rod is obtained, in which the transmission of power and force between the metal end members 6 and the fibre body 1 is completely ensured. In fact, when under tension, the frusto-conical shape of the skirt portion 9 of the end member 6, together with the convolutions or grooves 10 and the ferruling of the thickened ends 2 of the tubular body 1 of the rod, prevents any slipping or loss of adhesion between the end member 6 and the end 2 of the body of the rod. On the other hand, when under compression, the collar 8 of each end member 6 reacts against the ferruling block and the ferruled end 2 of the body of the rod, transmitting tangential forces to the portion of the body of the rod disposed between the end member 6 and the ferrule, adhesion therebetween also transmitting the compressive forces between the ferrule and the portion 2 of the rod.

In the method of manufacture shown in FIG. 6, which is the preferred method, each of the metallic end members 6 has in addition to skirt 9 a skirt extension 15 extending part-way along the inside of the cylindrical portion (1a) of the body (1) of the rod, the outer surface of the skirt 15 being cylindrical and the inner surface being cylindrical or conical. The skirt 15 is provided with scallop-like indentations or notches 16 distributed along its free edge, the indentations 16 affording a certain degree of radial flexibility to the edge of the skirt 15. The same effect can be achieved by reducing the thickness of the skirt 15 towards its free edge, its internal surface thus being conical.

As a consequence of the shape of the skirt 15 in the cylindrical part of the body 1 of the rod and the above-described radial flexibility, the body of the rod, on the one hand, is well supported on the end member 6 while, on the other hand, small variations in diameter of the rod body, by expansion or contraction, which may occur under compression or tension, are taken up by the elastic deformation of the skirt 15 without the body of the rod being subjected to excessive stress concentrations.

Naturally, the mandrel described in connection with FIG. 3 is modified to take account of the new shape of the end members 6.

Another difference between the rod shown in FIG. 6 and that described with reference to FIG. 1 is that, instead of stopping a little before the collar 8 at the end of each of the end members 6, the fibrous structure forming the body of the rod is prolonged and folded back against the inner face of the collar 8, as shown at 8a, in such a manner that the ferrule 12 holds the fibrous structure simultaneously against the frusto-conical extension 9 and against the collar 8. Experience has shown that this produces a more effective bond between each end member 6 and the body of the rod.

An outer layer 17 is obtained by a tight, step by step winding of an impregnated fibre tape over the ferrule 17. This layer 12 improves resistance of the rod to perforation by projectiles.

What is claimed is:

1. A stiff integral connecting rod adapted to longitudinally and bi-directionally transmit tensile forces as well as compressive forces, said rod having a hollow tubular body (1) in the shape of a generally cylindrical main portion (1a) ending with two generally frusto-conical tapering extremities (2) and formed of a plurality of layers (T1, T2) of tapes (T) composed of high-strength parallel fibers (f) bonded together by synthetic resin, at least one (T1) of said layers having its fibers (f) extending longitudinally parallel to the generatrix of said tubular body and at least one other (T2) of said layers being wound helically around said tubular body (1), an end fastening member (6) of hardware fitted onto said tubular body (1) at each tapering extremity (2) thereof, each of said end fastening members (6) having at one end a skirt (9) which extends inside said tubular body (1) in engagement with the inner surface of the corresponding tapering extremity (2) thereof and an end extension (15) engaging an adjacent length of said main portion (1a), said extension (15) being axially notched (16) adjacent its free inner end so as to be resiliently yieldable in a radial direction, each of said end fastening members (6) having further a radially projecting collar (8) at its outer end opposite to said skirt with an intermediate section (6a) of reduced diameter between said collar (8) and said skirt (9), said layers (T1, T2) of the tubular body (1) being applied and bonded in situ over said tapering extremities (2) to tightly engage the exterior surface of said skirt (9) and said reduced diameter intermediate section (6a) of each end fastening member (6), and ringlike means (12) encircling the layers of said tapering extremities over said reduced diameter section (6a) of each end fastening member (6) to firmly anchor the ends of said layers (T1, T2) to said end members.

2. A connecting rod as claimed in claim 1, wherein the said layer whose fibers are parallel to the generatrix of the tubular body comprises tapes of high-strength fibers encased in synthetic resin, said tapes overlapping along their margins with the extent of overlap increasing in the sections of restricted diameter of the tapering extremities so that the number of fibers in each section of the rod remains constant.

3. A connecting rod according to claim 1, wherein the outer surface of each end fastening member between said skirt and said collar is convoluted when viewed in axial longitudinal cross-section.

4. A connecting rod according to claim 1, wherein the free end of each said skirt comprises scallop-like notches.

5. A connecting rod according to claim 1, wherein the fibrous layers forming the tubular body include a flange-like extension contacting the inner face of the collar of each end fastening member.

6. A connecting rod according to claim 1, which comprises further an outer layer of an impregnated fiber tape wound around the rod body up to the collar of each end fastening member.

* * * * *

UNITED STATES PATENT OFFICE
CERTIFICATE OF CORRECTION

Patent No. 4,353,268    Dated October 12, 1982

Inventor(s) Claude Picard et al

It is certified that error appears in the above-identified patent and that said Letters Patent are hereby corrected as shown below:

On the title page:

The following should appear in the heading of the patent:

-- [30]   Foreign Application Priority Data

Mar. 10, 1976  [FR]    France ........ 76 06802

Nov. 19, 1976  [FR]    France ........ 76 34912 --.

Signed and Sealed this

Nineteenth Day of April 1983

[SEAL]

*Attest:*

*Attesting Officer*

GERALD J. MOSSINGHOFF

*Commissioner of Patents and Trademarks*